United States Patent Office 2,698,324
Patented Dec. 28, 1954

2,698,324
SYNTHETIC LUBRICATING OIL

Albert J. Shmidl, Crosby, Tex., assignor, by mesne assignments, to Standard Oil Development Company, Elizabeth, N. J., a corporation of Delaware No Drawing. Application March 23, 1953,
Serial No. 344,201

2 Claims. (Cl. 260—243)

The present invention is directed to an improved lubricating oil composition which is resistant to oxidation.

In accordance with the present invention an oxidation resistant lubricating oil composition is formed by reacting mono-cyclic alkyl naphthene in the gasoline boiling range, alpha olefin within the range of $C_5$ to $C_{13}$ and phenothiazine in the presence of a Friedel-Crafts type of catalyst. The result of this reaction is a composition which has lubricating oil characteristics and is resistant to oxidation.

In the reaction zone wherein the reactants are introduced for forming the composition of the present invention, it is desirable to have a naphthene to olefin ratio within the range of 2 to 4 parts of naphthene for each part of olefin by volume, preferably 3 parts of naphthene to one part of olefin by volume. The phenothiazine should be present within the range of .1 to 1 weight per cent, based on the alpha olefin in the reaction zone. The reaction preferably is conducted at a temperature within the range of 0° to 250° F. The amount of Friedel-Crafts type of catalyst used should be within the range of 1% to 5%.

While any of the Friedel-Crafts type of catalysts may be employed in commercial operations, it will often be desirable to use aluminum chloride as being more readily available and more convenient to use.

The mono-cyclic alkyl naphthene, which is one of the reactants used in forming the composition, should be in the gasoline boiling range. A feed stock consisting substantially of a single mono-cyclic alkyl naphthene may be employed for this purpose. However, it will often be found convenient to use a mixture of mono-cyclic alkyl naphthenes and if such mixture is in the gasoline boiling range it will be found to produce a desirable product.

The alpha olefin used as one of the reactants in forming the oxidation resistant lubricating composition may be within the range of $C_5$ to $C_{13}$. It is preferred that this alpha olefin be unbranched or slightly branched. If desired, a single alpha olefin may be employed as a feed stock. However, it will often be found that a mixture of alpha olefins is more readily available for use as the feed and such a mixture will be found satisfactory. By way of example a mixture of alpha olefins suitable for use in carrying out the reaction of the present invention may have the composition shown in the following table:

Table

| Fraction | Boiling Range | Vol. Percent, Based on Feed | Alpha Olefin Content, with percent based on total olefin in fraction |
|---|---|---|---|
| $C_5$ | 80–109 | 6.0 | 85 |
| $C_6$ | 110–169 | 20.1 | 93 |
| $C_7$ | 170–207 | 18.6 | 88 |
| $C_8$ | 208–255 | 15.9 | 84 |
| $C_9$ | 256–298 | 12.0 | 86 |
| $C_{10}$ | 299–330 | 6.0 | 75 |
| $C_{11}$ | 331–355 | 5.3 | 82 |
| $C_{12}$ | 356–390 | 6.3 | 76 |
| $C_{13}$ | 391–435 | 7.4 | 73 |

The practice of the present invention will now be further described by reference to the following example:

Example

A reaction mixture was formed consisting of 500 cc. of alpha olefin mixture having a composition similar to that shown in the preceding table, 1500 cc. methyl cyclopentane and 1.2 grams of phenothiazine. This reaction mixture was reacted in the presence of 15.0 grams of anhydrous aluminum chloride at a temperature of 150° F. After the reaction had proceeded for six hours the aluminum chloride was removed and the lubricating oil fraction of the polymer separated by distillation. The polymer yield obtained was 235 cc. The separated polymer was found to have the following characteristics:

Gravity °API 31.7
Viscosity SSU at 210° F. 70.6
Viscosity SSU at 100° F. 684
Viscosity Index 88.4

A portion of the polymer was subject to oxidation under the conditions of the Ramsbottom oxidation test. In this test 40 cc. of oil in a glass container is heated at 392° F. and oxidized by passing 15 liters of air per hour through the oil for 12 hours. The resultant oxidized polymer was found to have a viscosity SSU at 210° F. of 82.3. Thus, the oxidation of the oil resulted in a viscosity increase of only 16.6% in comparison with the original polymer oil when tested at 210° F.

While specific conditions have been given in the example, it is to be understood that these conditions are given by way of illustration only and as heretofore explained a reaction temperature within the range of 0 to 250° F., and a Friedel-Crafts type of catalyst in an amount within the range of 1% to 5% based on the alpha olefin may be used. Similarly, any mono-cyclic alkyl naphthene in the gasoline boiling range, that is in the range of 80° F. to 430° F. and any unbranched or slightly branched alpha olefin or alpha olefin mixture within the range of $C_5$ to $C_{13}$ may be used for the reactants.

Having fully illustrated the practice of the present invention, what it is desired to claim is:

1. An oxidation resistant lubricating oil composition which is the product formed by reacting within the range of 2 to 4 parts of mono-cyclic alkyl naphthene in the boiling range of 80° F. to 430° F. with one part of alpha olefin within the range of $C_5$ to $C_{13}$ and phenothiazine within the range of .1 to 1 weight percent based on said alpha olefin in the presence of a Friedel-Crafts type of catalyst within the range of 1 to 5% based on said alpha olefin with the temperature of the reaction within the range of 0 to 250° F.

2. A composition in accordance with claim 1 in which the Friedel-Crafts type of catalyst is aluminum chloride.

References Cited in the file of this patent

Fusion et al.: "Org. Chem." (1947), page 29.